Sept. 3, 1963 E. SCHASCHL 3,102,979
APPARATUS FOR MEASURING CORROSION HAVING PROBE WITH
CATHODICALLY-PROTECTED, TEMPERATURE
COMPENSATING ELEMENT
Filed Nov. 30, 1960

INVENTOR.
EDWARD SCHASCHL
BY
ATTORNEY

United States Patent Office 3,102,979
Patented Sept. 3, 1963

3,102,979
APPARATUS FOR MEASURING CORROSION HAVING PROBE WITH CATHODICALLY-PROTECTED, TEMPERATURE COMPENSATING ELEMENT
Edward Schaschl, Crystal Lake, Ill., assignor to The Pure Oil Company, Chicago, Ill., a corporation of Ohio
Filed Nov. 30, 1960, Ser. No. 72,737
5 Claims. (Cl. 324—71)

This invention relates to a corrosion-test method and probe for use in determining the extent of corrosion of materials of construction in terms of metal loss and, more particularly, to a new form of resistance-change test probe designed for use in environments subject to rapid variations in temperature.

In solving or observing specific plant corrosion problems, corrosion tests carried out in the operating equipment provide the most reliable and consistent results. By observing the influence of corrosion under actual service conditions, the heterogeneousness of the corrosive environment is taken into consideration. The prior art teaches the use of various test probes and associated apparatus for measuring corrosion rates under service conditions. A corrodible test specimen, preferably fabricated from the same material as the equipment under study, is exposed to the corrosive atmosphere, and the extent of corrosion of the test specimen is determined from time to time. From the rate of corrosion of the test specimen, the rate of corrosion of the operating equipment under study can be estimated.

Methods have been devised which make use of the correlation between change in electrical conductivity and change in cross-sectional area of a test element to determine the rate of corrosion of materials of construction in a corrosive atmosphere through the use of corrosion-test probes connected to electronic resistance-change meters. These instruments employ resistance bridges to indicate quantitatively those changes in physical characteristics which cannot conveniently be measured by other methods. In such apparatus, one coupon or test specimen is supported by the probe means in exposure to the corrosive environment, whereas a second compensating coupon or test element is protected from the corrosive effects of the environment by means of a suitable corrosion-impervious coating, or by placing the compensating element within the body of the probe. The change in resistance of the exposed, corroding element is determined by connecting the elements of the probe so as to comprise one-half of a typical resistance bridge. Suitable electronic connections are made with the second half of the bridge which is placed outside the corrosive environment along with the power supply to the bridge and an appropriate electrical meter, such as galvanometer, which functions as a null detector. Loss of metal on the unprotected specimen induces small increases of resistance in the specimen so that the ratio of resistances of the corroding specimen and protected specimen change, and this change is measured by a suitable metering system and expressed directly in terms of corrosion rate.

Such corrosion-measurement devices provide, in theory, automatic temperature compensation so that erroneous readings are not obtained when the temperature of the corroding element increases or decreases during the test period. The corroding element and the compensating element are always at the same temperature, and hence are affected similarly by changes in temperature in the corrosive environment, so that if the test element and compensating element have similar temperature-resistance characteristics, the resistance of each element will change proportionately when both undergo the same temperature change. Thus the ratio of the resistances of the elements is not affected by temperature change. Where the changes of temperature occurring during the test period are not rapid, the test element and compensating element are always at about the same temperature, and excellent temperature compensation is, in fact, automatically obtained. But where the temperature changes occurring during the test period are sudden or rapid, the compensating element which is coated with a corrosion-impervious material, or worse, protected within the body of the probe, is insulated to a certain extent from the corrosive environment, so that the change of temperature of the compensating element lags behind the change in temperature of the corroding element. Because of the extreme sensitiveness of the resistance measurements made, it has been found that temperature differences of as little as 0.1° F. between the corroding element and the compensating element may introduce significant errors.

It is an object of this invention to provide a corrosion-test probe which employs two bare, uncoated elements in exposure to the test environment, so that the temperature response of both elements is identical. Another object of this invention is to provide a test probe for use in corrosion studies which is not subject to temperature-induced errors. Another object of this invention is to provide a method of accurately determining the corrosion of test elements without the introduction of temperature-change-induced errors.

Briefly, in the apparatus and method of this invention, a bare test element and a bare compensating element are placed in exposure to a test environment, so that both elements respond rapidly and proportionately to sudden temperature changes occurring within the environment, corrosion of the compensating element being prevented by the application of a cathodically protecting current thereto.

This invention is best described with reference to the drawings, of which:

Figure 1:
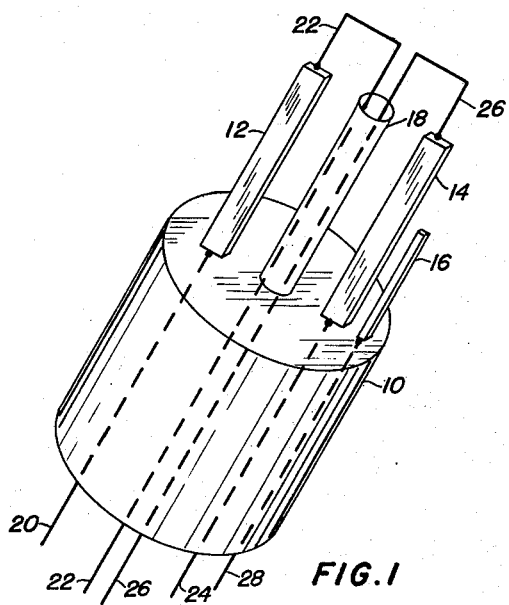
FIGURE 1 is a perspective view of a test probe fabricated in accordance with this invention.

Referring to FIGURE 1, base member 10 supports test element 12, compensating element 14, electrode 16, and insulator 18, and is preferably fabricated of a corrosion-impervious, non-conductive plastic. The test element and compensating element are fabricated of a material of construction the corrosion rate of which is to be investigated. Insulator 18 is tubular and fabricated of a corrosion-impervious material. Test element 12 is connected to electrical lead wire 20, which extends through base member 10, and to lead wire 22, which extends through insulator 18 and base 10. Reference element 14 is similarly connected to lead wires 24 and 26. Electrode 16 is connected to lead wire 28.

Test element 12 and compensating element 14 are identical in physical shape, and are of a metal to be tested in a corrosive environment. Electrode 16 may be made of platinum, or it may be made of any other noble metal or material which is conductive and capable of serving as an anode.

Figure 2:
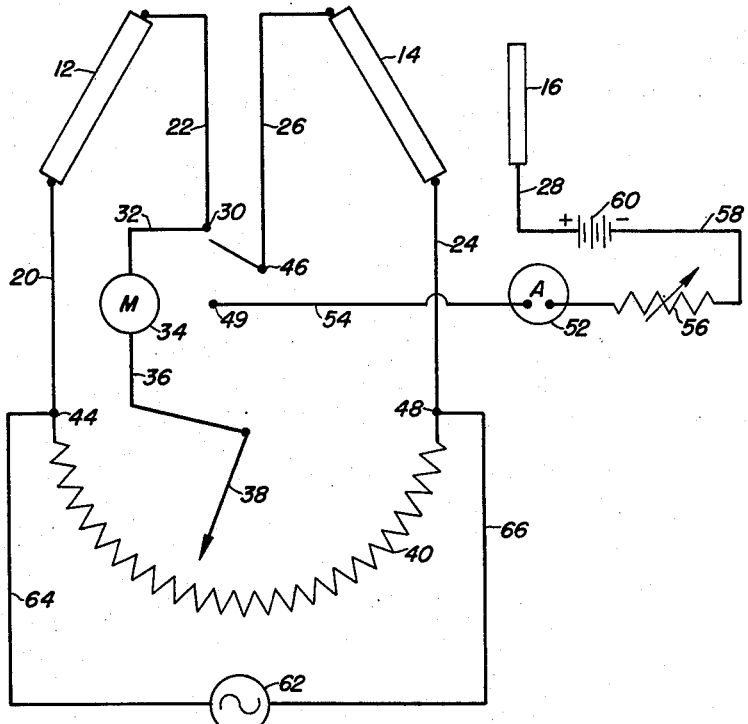
FIGURE 2 is a schematic diagram of electric circuitry which may be employed with the test probe and method of this invention.

Referring to the schematic diagram of FIGURE 2, test element 12 is connected through lead wire 22 to switch contact 30 which, in turn, is connected through lead wire 32 to electronic meter 34. Meter 34 is connected through lead wire 36 to sliding contact 38 on potentiometer 40. Test element 12 is connected through lead wire 20 to terminal 44 of potentiometer 40. Compensating element 14 is connected through wire 26 to switch terminal 46, and through wire 24 to terminal 48 of potentiometer 40. Switch contact 49 is connected through wire 54 to ammeter 52, which is connected to variable resistance 56. Resistance 56 is connected in series through wire 58 to a D.C. power supply 60, and power supply 60 is connected through wire 28 to electrode 16. Power source 62 is connected to terminals 44 and 48 of potentiometer 40 through conductors 64 and 66, respectively.

In operation, the probe element and anode are immersed in an environment under study, the switch is thrown to connect terminal 46 to contact 30, thereby connecting the test and reference element in the bridge circuit, and the bridge is balanced by adjustment of potentiometer 40. Then the switch is thrown to connect terminal 46 with contact 49, thereby incorporating element 14 as the cathodic member in a cathodic protection circuit, and variable resistance 56 is adjusted to cause sufficient current flow, as indicated by ammeter 52, to prevent corrosion of reference element 14. When it is desired to determine the change in resistance of test element 12 caused by corrosion thereof, and thereby determine the amount of corrosion which has occurred, the switch is again thrown to connect terminal 46 with contact 30, and the different in resistance is noted. This procedure is repeated as often as is desired during the test.

It will be noted that electrode 16, instead of being fabricated of a noble metal, may be made of a metal which is anodic with respect to the test and compensating elements. For example, where the test and compensating elements are made of steel, the electrode 16 may be fabricated of magnesium or zinc, so that it is capable of serving as a sacrificial anode to cathodically protect the compensating element 14. In this embodiment, meter 52, variable resistance 56, and power source 60 may be eliminated, the sacrificial anode 26 then being connected directly to terminal 49 of the switch. Where the electronic means for measuring the change in the ratios of the resistances of the test element and compensating element operates on alternating current, the switch means need only make and break connection with contact 30, the connection with contact 49 being permanent. Switch means must be provided, however, so that contact 46 is not always in electrical connection with contact 30, in order that electrode 16 will provide cathodic protection only for compensating element 14, and not for test element 12 except during the short intervals when measurements are being read. During the period of test, it is necessary to connect the test element and compensating element electrically, from time to time, to make readings, when the electronic system employed to measure the ratio of the resistances of test element 12 and compensating element 14 is a bridge circuit. When this is done, electrode 16 temporarily provides cathodic protection to both the test element and compensating element. Once the measurements have been completed, and the connection between terminal 46 and contact 30 broken, test element 12 again is free to corrode, while compensating element 14 remains under cathodic protection. The flow of current through the test element and compensating element and through the cathodic protection circuit does not interfere with the measurement of the resistance ratio of the test element and compensating element when the measurements are made by means of an alternating current, because the current flow in the protection circuit is always direct current, and the electronic measuring means can be designed to segregate direct and alternating potentials.

Various measuring circuits may be used with the apparatus and method of this invention, and are exemplified by the resistance-change meter described in U.S. Patent 2,830,265. The test element and compensating element may be fabricated as disclosed in that patent. Advantages are obtained by constructing the corrosion-test element and compensating element to have the same resistance. However, suitable unsymmetrical corrosion-testing elements can be fashioned in accordance with this invention in which the resistances of these elements are not identical, provided, for the sake of consistency, a material of construction is employed which is substantially uniform in composition and resistivity. As a practical matter, there are mechanical and electrical factors which have to be taken into consideration in the design of suitable corrosion-testing probe elements. Lead resistance, for example, will be appreciable if a small corrosion-test probe is used in which the resistance of one element is only about $\frac{1}{10}$ or less the resistance of the other element. This factor is not pronounced in the case of large, unsymmetrical, test elements in which the resistance of even the smaller one is large compared to the lead resistance. The test element and compensating element are preferably ribbon-like and have a ratio of length-to-cross-section in excess of 100 to 1. Lead resistance can be substantially eliminated by the manner of interconnection of the corrosion-test unit with the measuring circuit. Mechanical considerations include making the test-probe unit large enough for easy assembly and attachment of lead wires.

From the description it is seen that the invention is necessarily confined to the use of test elements having the property of conducting electricity and showing a change in resistance proportional to changes in cross-sectional area due to corrosion. The materials of construction that meet these requirements include all metals and metal alloys, such as steel, iron, bronze, brass, copper and the like. The environments to be investigated by the test elements or completed probes of this invention may be in any physical state or may exist as a mixture of substances in different physical states. The corrosive environment may be gaseous, vaporous, solid, liquid, or semi-solid, or mixtures of these forms of matter, but must be conductive.

The embodiments of the invention in which an exclusive property or privilege is claimed are defined as follows:

1. An apparatus for measuring the corrosion of a test element in a corrosive environment comprising a bare, electrically conductive, corrodible test element, a bare compensating element having a temperature-resistance characteristic similar to that of said test element, an electrode, means supporting said elements and electrode for exposure to a test environment, said electrode being supported adjacent to said compensating element for the flow of current therebetween through said environment, and a direct current source connected between said electrode and said compensating element.

2. An apparatus in accordance with claim 1 in which said elements are of similar dimensions and are fabricated of the same metal.

3. An apparatus in accordance with claim 2 in which said elements are ribbon-like and have a ratio of length-to-cross-section in excess of about 100 to 1.

4. An apparatus for measuring the corrosion of a test element in a corrosive environment comprising a bare, electrically conductive, corrodible test element, a bare, compensating element having a temperature-resistance characteristic similar to that of said test element, an electrode fabricated of a metal anodic to said compensating element electrically connected thereto, said electrode being supported adjacent to said compensating element for the flow of a cathodically protecting current therebetween through said environment, means for supporting said electrode and said elements for exposure to a test environment, and conductors connected to the terminal ends of said elements.

5. An apparatus for measuring the corrosion of a test element in a corrosive environment comprising a bare, electrically conductive, corrodible test element, a bare compensating element having a temperature-resistance characteristic similar to that of said test element, an electrode, means supporting said elements and electrode for exposure to a test environment, said electrode being supported adjacent to said compensating element for the flow of current therebetween through said environment, and switch means for connecting a direct-current source across said electrode and compensating element, and for connecting said test element and compensating element to a resistance-ratio-measuring circuit.

References Cited in the file of this patent
UNITED STATES PATENTS 2,839,722  Marsh _____ June 17, 1958